(12) United States Patent
Klotz et al.

(10) Patent No.: US 8,193,920 B2
(45) Date of Patent: Jun. 5, 2012

(54) METHOD AND DEVICE FOR OPERATING A SENSOR SYSTEM

(75) Inventors: Albrecht Klotz, Aichtal (DE); Jan Sparbert, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 849 days.

(21) Appl. No.: 11/658,616

(22) PCT Filed: Jun. 14, 2005

(86) PCT No.: PCT/EP2005/052728
§ 371 (c)(1),
(2), (4) Date: Jun. 5, 2009

(87) PCT Pub. No.: WO2006/015894
PCT Pub. Date: Feb. 16, 2006

(65) Prior Publication Data
US 2010/0007476 A1    Jan. 14, 2010

(30) Foreign Application Priority Data
Aug. 7, 2004 (DE) .......................... 10 2004 038 494

(51) Int. Cl.
*B60Q 1/00* (2006.01)

(52) U.S. Cl. ...................................... 340/425.5; 342/70

(58) Field of Classification Search ............... 340/425.5, 340/435, 436, 903; 342/70, 54, 55, 107, 342/149
See application file for complete search history.

(56) References Cited

U.S. PATENT DOCUMENTS

| | | | |
|---|---|---|---|
| 5,283,622 A | 2/1994 | Ueno et al. | |
| 5,717,399 A | 2/1998 | Urabe et al. | |
| 5,999,092 A * | 12/1999 | Smith et al. | 340/436 |
| 6,289,332 B2 * | 9/2001 | Menig et al. | 342/70 |
| 6,941,216 B2 * | 9/2005 | Isogai et al. | 342/70 |
| 2002/0057195 A1 | 5/2002 | Yamamura | |
| 2003/0112172 A1 * | 6/2003 | Shinoda et al. | 342/70 |
| 2004/0178945 A1 * | 9/2004 | Buchanan | 342/70 |

FOREIGN PATENT DOCUMENTS

| | | |
|---|---|---|
| EP | 0 899 583 | 3/1999 |
| EP | 1 321 776 | 6/2003 |
| JP | 6-124340 | 5/1994 |
| JP | 8-315299 | 11/1996 |
| JP | 9-231379 | 9/1997 |
| JP | 9-264954 | 10/1997 |
| JP | 10-90406 | 4/1998 |
| JP | 10-244891 | 9/1998 |
| JP | 2001-109999 | 4/2001 |
| JP | 2001-315601 | 11/2001 |
| JP | 2003-19913 | 1/2003 |
| JP | 2003-248055 | 9/2003 |
| JP | 2004-117071 | 4/2004 |
| WO | WO 03/001472 | 1/2003 |
| WO | WO 2006/015894 | 2/2006 |

\* cited by examiner

*Primary Examiner* — John A Tweel, Jr.
(74) *Attorney, Agent, or Firm* — Kenyon & Kenyon LLP

(57) ABSTRACT

A method and a device for operating a sensor system are described, a processing unit being connected to at least one sensor of the sensor system via communication connections and the processing unit transmitting data, which represent the at least one sensing range and/or detection area of the sensor, and/or control data to control the mode of the sensor, to at least one of the sensors.

8 Claims, 3 Drawing Sheets

METHOD AND DEVICE FOR OPERATING A SENSOR SYSTEM

FIELD OF THE INVENTION

The present invention relates to a method and a device for operating a sensor system, which preferably includes at least two sensors which are different from one another.

BACKGROUND INFORMATION

German Patent Application No. DE 101 33 945 discloses a method and a device for operating a sensor system. Sensors of the sensor system, which are preferably implemented in different sensor technologies (radar, video, ultrasound, etc.), communicate with a processing unit (sensor data fusion unit or information platform). The sensors transmit sensor data, i.e., results of the measuring procedure of the sensors, to the processing unit, which are processed further there and relayed to at least one, preferably multiple functionalities. Furthermore, there is also a data exchange from the processing unit to the sensors. These feedback data are used for attentiveness control and/or preconditioning of the individual sensors. For example, identification data are exchanged to identify detected objects, in particular transmitted from the processing unit to at least one sensor.

SUMMARY OF THE INVENTION

An improvement of the detection performance and the detection quality of the participating sensor unit is achieved by transmitting information from the processing unit to the sensor unit which represents a description of at least one area to be detected (in particular a spatial area) and/or at least one operating mode of the affected sensor unit to be turned on. Operating mode and detection scope are optimized for the task to be executed. The quality of the information which is relayed from the processing unit (information platform) thus also increases.

It is particularly advantageous that optimum exploitation of the resources of the sensors and influence of the sensor-internal information acquisition processes are achieved.

It is particularly significant that the information platform may serve a significantly expanded spectrum of information users, such as functions like automatic emergency brake systems, adaptive vehicle-speed control systems, etc., having very different requirements.

As described above, targeted networking of information between the existing sensors and a situation-dependent sensor controller is provided. The information is transmitted between the sensors as in the related art via a central processing unit (information platform), which additionally assumes the sensor control on the basis of a situation acquisition and description contained in the processing unit or supplied to the processing unit. The information transmitted from the processing unit to the sensors is advantageously mapped as sensor-independent. This information is then converted into sensor-specific data in the sensor.

The information transmitted from the processing unit to the sensors is at least one of the following types of information:

- for essential operating states, a description of the spatial sensing range (windowing) in particular, for example, a restriction of the spatial sensing range and/or a windowing of the object data on the basis of at least one criterion such as velocity, position, angle, etc.;
- a description which represents at least one detection area to be particularly observed (region of interest), which is preferably significantly smaller than the above-mentioned windowing;
- prioritization and/or identification descriptions for these detection areas;
- a tracking list having identity markers of objects to be particularly observed;
- information relating to the state of objects (e.g., location of incidence in the sensing range and/or detection area, velocity, size, type, etc.), which is potentially newly detected by the sensor and originates from prediction of the object change.

Through these measures, targeted control of the sensor and thus optimized use of the sensor resources are achieved.

Additionally or alternatively thereto, the processing unit transmits to the sensors control data for setting a sensor mode. These control data are understood as sensor-specific and sensor-unspecific possibilities for changing the information content of the information provided by the sensor. Possibilities of this type are, for example, the sensor cycle time, the quality threshold of the information to be provided, the type of information, the technological methodology of information acquisition, prioritization between different types of information of a sensor, etc. This also contributes to improving the detection performance and adapting the detection quality of the sensors through optimum exploitation of the sensor resources and influencing the sensor-internal information acquisition processes.

Further advantages result from the following description of exemplary embodiments and from the dependent claims.

DETAILED DESCRIPTION

Figure 1:
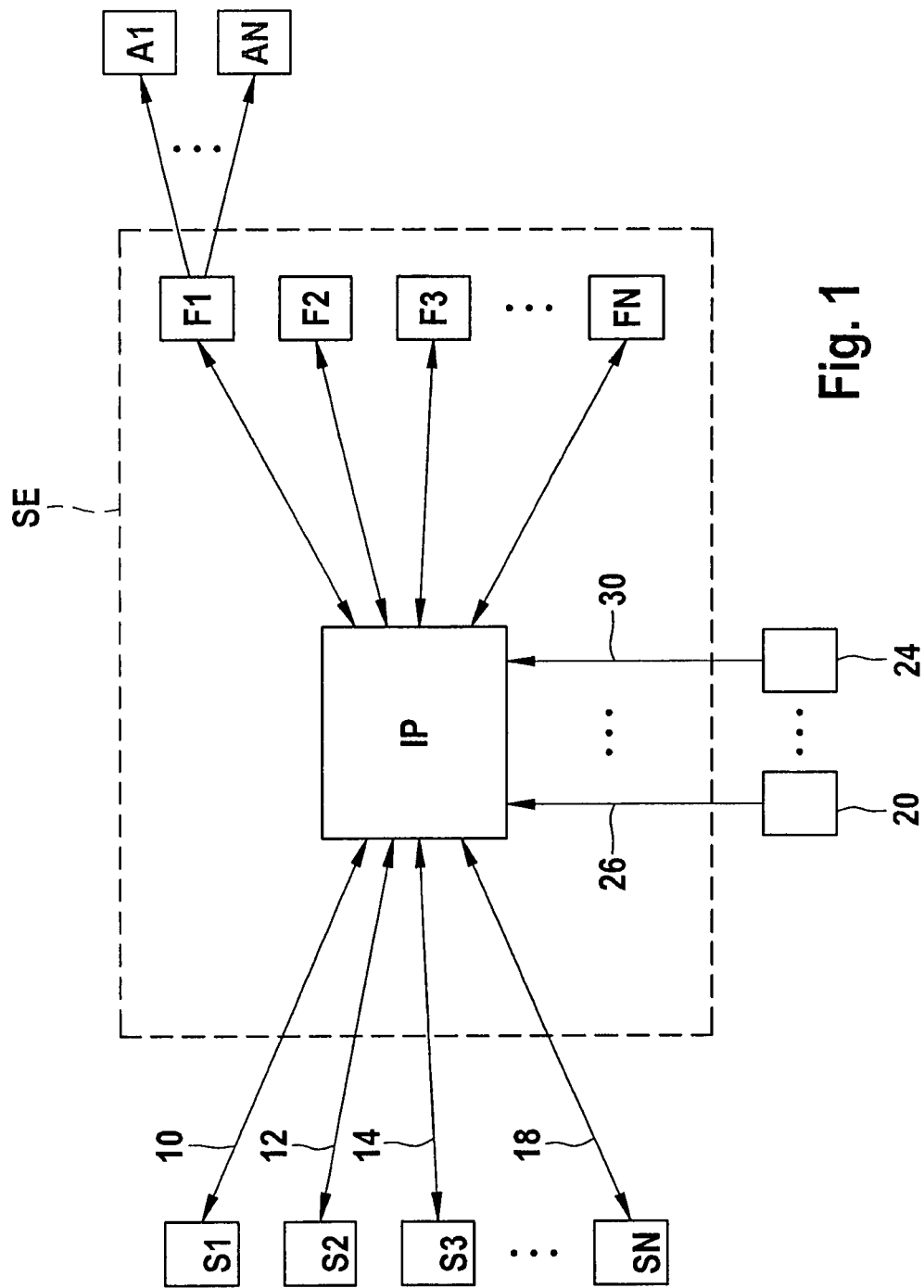
FIG. 1 shows an overview of a sensor system having a processing unit (information platform) controlling the sensor system.

FIG. 1 illustrates an overview of a sensor system which sends sensor signals to a processing unit and receives information for controlling the sensors from this processing unit. The sensor system includes multiple, at least two, sensors (S1 through SN). In the preferred exemplary embodiment, the sensors are sensors for detecting the surroundings of a vehicle, e.g., ultrasonic sensors, radar sensors, video sensors, etc. These sensors are connected via preferably bidirectional communication connections 10 through 18 to a processing unit (information platform, IP). In the preferred exemplary embodiment, the communication system is a bus system, such as a CAN, which connects the sensors and the processing unit to one another for mutual data exchange. In the preferred exemplary embodiment, the processing unit is part of a control unit SE. The processing unit is implemented by one or more software modules which run on one or more microcomputers of control unit SE. In one embodiment, data of other sensor systems 20 through 24 are supplied to the information platform via corresponding communication connections 26 through 30, e.g., in order to supply operating variables such as the intrinsic velocity, which are not detected by sensor system S1 through SN, to the information platform.

These operating variables are used by the information platform, if necessary, by being considered in calculating information and/or control variables for sensor system S1 through SN. Furthermore, the information platform ascertains variables for various (at least two) functionalities, which are indicated in FIG. 1 by F1 through FN. These functionalities affect functions such as an automatic emergency brake, an adaptive vehicle-speed controller, a parking aid, a lane departure warner, etc. Since the system shown is preferably used for the exemplary functionalities within the scope of object recognition, the data transmitted from the information platform to the functionalities in the preferred exemplary embodiment are object data fused from the sensor data, which are then analyzed by the functionalities in accordance with their function. Functions F1 through FN activate actuators, such as warning elements, brake systems, etc., which are indicated in the example of function F1 in FIG. 1. The data connection between the information platform and the various functions is also produced via a bus system, such as a CAN bus system, in the preferred exemplary embodiment. In addition, the data exchange is bidirectional in a preferred exemplary embodiment, data relating to the activation state of the function being transmitted from the functions to the information platform, for example.

In a preferred embodiment, a sensor system including two sensors, which detect object data from the surroundings of a motor vehicle, is used. The preferred exemplary embodiment contains two different sensors and two functions which differ in their requirements in relation to the processing unit (information platform). In the preferred exemplary embodiment, a mono video camera and at least one radar sensor are used as the sensors, preferably having a shared (overlapping) sensing range or adjoining sensing ranges. On the basis of the data ascertained by these sensors, various functions of the motor vehicle, such as an automatic emergency brake system and an adaptive vehicle-speed controller, which operate as a function of the detected objects and their characteristics, are controlled. Object data outside these boundaries are discarded.

In one exemplary embodiment, the sensing range is first predefined for at least one of the sensors, e.g., by presetting a maximum range and/or maximum angles. The information platform establishes these values as a function of the function that is to be supported. Thus, for example, for an active adaptive vehicle-speed controller, a comparatively large range having small angles is predefined, while for an active parking aid, the values for the sensing range are preset in an opposite manner.

The combination of a mono video sensor with a radar sensor improves the plausibility check of the objects detected in particular. The plausibility check is performed using the information platform. For this purpose, the detection data of the radar sensor (such as velocity, angle, and/or distance from the detected object) are supplied to the information platform. This produces a list of detection areas (region of interest, ROI), which are possibly provided with different priority values, from the object data of the radar sensor. This list of the detection areas is transmitted to the video sensor. The data include coordinates of a singular point (e.g., center point or center of gravity) and the dimensions of the detection area and/or the velocity of the point, for example. Furthermore, an identification number and possibly a priority rating of the detection areas are transmitted. The video sensor receives this list and processes the areas contained in the list in the predefined priority sequence. In the preferred exemplary embodiment, the video sensor or its analysis unit analyzes the recorded image in the transmitted detection areas for object recognition. Depending on the embodiment, all sensors operate using the same coordinate system or a transformation is performed from the coordinate system of the radar sensor to that of the video sensor and vice versa, preferably in the information platform. If the image analysis of the video sensor in the transmitted area(s) results in one or more objects, the data and/or the information are transmitted, possibly together with the identification number, to the information platform and the object(s) ascertained by the radar sensor is/are checked for plausibility therein. If the video sensor does not recognize an object in the transmitted detection area, it is to be assumed that the object detected by the radar sensor is a false positive. After the plausibility check, objects recognized as confirmed are processed further by the information platform, e.g., the object data or information derived therefrom is transmitted to the connected functions.

The plausibility check outlined above preferably occurs in the information platform, but may also be a component of the software of the video sensor. The video sensor uses known procedures for object detection.

Furthermore, in the scope of a mode control of the video sensor, recognition thresholds may be lowered to ascertain an object in the cases in which the detection area is predefined. This is in light of the fact that a more rapid and targeted detection is achievable if an observation is expected. In the scope of time-critical functions, in one embodiment, the information platform may control the video sensor in such a way that the plausibility check of the radar objects occurs more rapidly, for example, in that the processing in the video sensor is terminated after a few relevant image areas and/or the plausibility check is attenuated. The latter is performed, for example, by using only location information for the object for the plausibility check, while dispensing with the velocity information for the plausibility check. The corresponding signals for controlling the sensor are transmitted from the information platform to the sensor as a function of the operating state (e.g., emergency brake function active or not).

A further possibility for accelerating the plausibility check of the object recognition of the radar sensor by the video sensor is achieved by preconditioning the video objects. This is preferably performed by deriving, on the basis of the object data ascertained by the radar sensor, such as location, velocity, movement direction, etc., the location of the expected incidence of the object in the detection area of the sensor and producing an image area to be examined around this location, which is in turn transmitted to the video sensor.

In one exemplary embodiment, sensors are used which detect information (e.g., width, curvature, etc.) about the track, the lane or the roadway (roadway sensors), and in addition detect objects (object-detecting sensors). Sensors of this type are, depending on the embodiment, separate, or both functions are detected by one sensor (e.g., a video sensor). In the roadway sensors, a mode control is performed in that the information platform turns off at least a part of the lane detection when a driving condition is achieved in which this part is not necessary (e.g., curb recognition is necessary in the city, but not on freeways, so that this part may be turned off here). Information is transmitted here from the information platform to the sensor which represents the expected lane marking. The sensor adapts itself and/or its analysis as a function of this information. Resources are thus saved. Furthermore or alternatively, a road type may be transmitted (freeway, curvy road, etc.) to adapt the model for roadway edge or lane recognition, so that the quality of the estimate of the parameters is improved.

Figure 2:
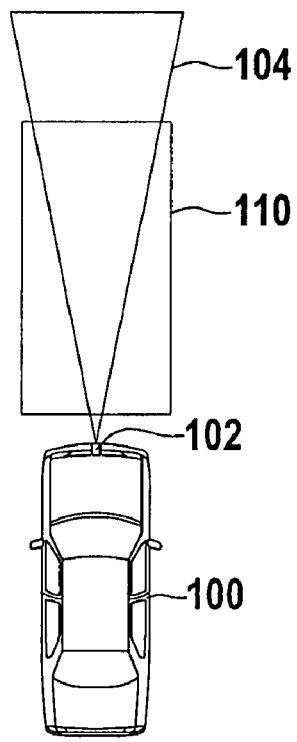
FIGS. 2-4 show the effect of the procedure according to the present invention.
Figure 3:
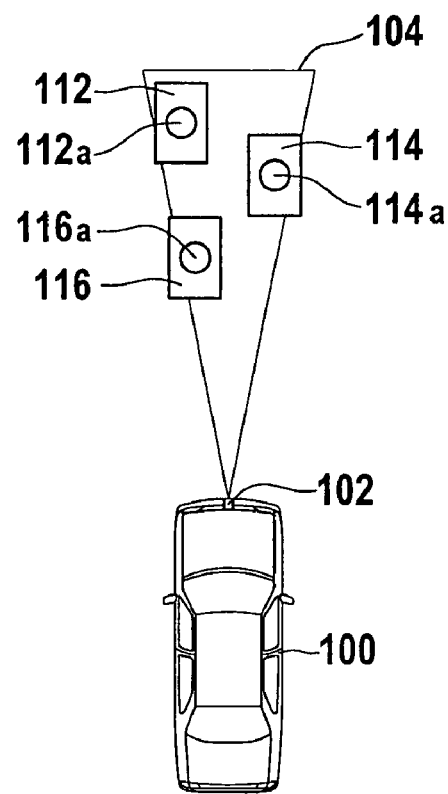
Figure 4:
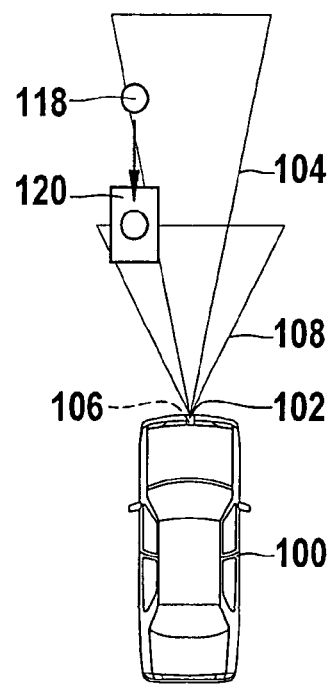

The object-recognizing sensors are supplied with additional information by the information platform in accordance with the description above. This is explained on the basis of the mode of operation illustrated in FIGS. 2 through 4. FIG. 2 shows the windowing of the object data to be detected (establishing the sensing range). FIG. 3 shows the predefinition of one or more detection areas (ROI), while the preconditioning of detected objects is illustrated in FIG. 4.

The vehicle to which the sensors are attached is identified by 100 in all three figures. A first surroundings sensor 102 and its sensing range 104 are illustrated in FIGS. 2 and 3. A second surroundings sensor 106 having a broader sensing range 108, but a shorter range, however, is illustrated in FIG. 4 in addition to sensor 102 and its sensing range 104.

As shown in FIG. 2, windowing of the object data or a restriction of the sensing range is performed to reduce resources. The information transmitted from the information platform to the sensor contains data which represent a delimitation of the detection area of the sensor, such as minimum and/or maximum values of the coordinates delimiting the sensing range, velocity values which restrict the width of the sensing range, and/or road parameters, which establish the width of the sensing range (two-lane road, four-lane road, etc.). The sensor receives this data and produces adapted sensing range 110 therefrom as illustrated in FIG. 2. Adaptation of the sensing range to the particular active function (e.g., parking aid or vehicle-speed controller) and/or adaptation to the travel situation (e.g., type of road) is thus achieved and the detection quality of the sensor system is improved while optimizing the resources.

As a supplement to the predefinition of a sensing range or alternatively thereto, data relating to at least one detection area to be particularly observed are transmitted by the information platform to the sensor(s). These data are derived from the data of a detected object of another sensor, such as a radar sensor, and include, for example, the coordinates for the center point (or center of gravity or a singular point) of this detection area and the velocity of the change of this point together with particular variance values. A unique identification number is linked to each detection area and/or its data. Through the restriction to a few regions of interest, the resources in the sensor, preferably in the video sensor, may be reduced and the most important information may thus be generated in a very short time. This is of interest above all in time-critical functions, for example, during automatic emergency braking, during which the object detection and plausibility check must occur very rapidly. The identification numbers are assigned by the information platform and relayed to the sensor. The results ascertained by the sensor (e.g., "object present" and/or object data and/or error message) are transmitted back with the identification number to the information platform. The information platform may thus monitor the execution on the basis of the numbers, since the sensor sends back corresponding information under this identification number to the information platform following the plausibility check of the recognized object and/or following its own object recognition. The identification number is newly assigned by the information platform only when the processing has occurred. On the basis of this feedback, the information platform also recognizes an overload in the processing in the sensor if the execution of the task has not been signaled back within a predefined period of time. In the case of an overload, the information platform indicates this to the active function and/or assigns prioritization values to the sensor or adapts existing prioritization values by dispensing with predefined tasks, e.g., as outlined above, or only performing these in a restricted way.

Alternatively to the description of special detection areas, a tracking list of the object data having object identification numbers is produced by at least one of the sensors or the information platform. The data for windowing and/or generation of the detection areas are produced on the basis of this tracking list by the information platform and transmitted to the at least one other sensor.

The achievement of the object outlined above is shown in FIG. 3. Vehicle 100 has a sensor system 102, which has at least one sensor having a detection area 104. Detection areas (ROI) 112, 114, 116 are shown, which are characterized by variables such as: center point (e.g., 112a, 114a, 116a, optionally having variance values and (not shown) velocity, optionally having variance values, the variance values expressing the uncertainty of the ROIs). The detection areas shown, which are reduced on the basis of detected objects of another sensor of the sensor system, are analyzed especially frequently or exclusively by the analysis unit of the affected sensor for the presence and/or the properties of objects in these areas.

A third option for the attentiveness control of the sensor system is the preconditioning of at least one of the sensors. At least one of the sensors of the sensor system transmits object data to the information platform which the information platform converts into data for another sensor having another sensing range, which represents in particular the location of the expected penetration of the object into the sensing range of the sensor. In the preferred exemplary embodiment, the data transmitted by the information platform to this sensor relates to the location at which the penetration of the object into the sensing range of the sensor is to be expected and possibly additionally the velocity and/or movement direction of the object. This is performed in the preferred exemplary embodiment in the scope of the transmission of the data to a special detection area (ROI). The sensor will then be able to adjust itself optimally to the new object to be detected on the basis of this information, for example, in regard to tracking initialization or angle assignment.

This example is explained in greater detail on the basis of FIG. 4. Vehicle 100 has a sensor system having at least two sensors 102 and 106. The sensing range of sensor 102 is identified by 104, while sensor 106 has a broader sensing range 108 having a shorter range. This is a typical constellation for the use of a radar sensor 102 and a video camera 106. The object detected by radar sensor 102 is identified by 118. It may be calculated from the object data (location, velocity, direction) which are transmitted from sensor 102 to the information platform whether and possibly at which location it is probable that the object will reach sensing range 108 of sensor 106. The information platform therefore ascertains a special detection area 120, which is communicated to sensor 106 and represents the location of the expected penetration of the object into the sensing range. The sensor observes this detection area preferentially (or exclusively together with the other communicated detection areas) and may therefore set itself appropriately even before appearance of the new object to be detected.

As a supplement thereto, prioritization data are transmitted with the detection area data which predefine the sequence or frequency of processing of the areas for the sensor.

In addition to the transmission of detection area data from the information platform to the sensor, in the opposite direction, information is transmitted from the sensor to the information platform which represents the status of the processing of the transmitted special detection areas. This is performed by specifying the processed identification numbers of the detection areas and possibly using a time stamp of the processing to ascertain a time delay.

In addition to or instead of the transmission of data relating to the detection areas to be detected, there is also control of the operating mode of individual sensors, for example, control of the cycle time, the processing depth, the prioritization to generate different information components, etc. This mode control is a function of the operating state of the connected functionalities in particular. For example, if an automatic emergency brake function is active, this is communicated to the information platform, which transmits a reduction of the cycle time to the sensors. If the automatic emergency brake function is deactivated, the cycle time is lengthened again. In some operating situations it is advisable to obtain incomplete information earlier. This is the case, for example, if the affected sensor is only used for the plausibility check of already detected objects. In this case, it may be sufficient in one embodiment to feed back information even when the sensor-internal plausibility check has not yet been completely finished for an object, but an object was recognized, or if the object states are only partially known. Corresponding control information is transmitted from the information platform to the affected sensor.

Furthermore, it is possible to prioritize the operating areas of the sensor. Thus, for example, the prioritization may be shifted between lane detection and object detection of a video sensor, for example, if lane detection has a lower priority than object detection in cities. In this case, for example, object detection is performed more frequently than lane detection. More optimum resource exploitation is thus achieved. Corresponding information about the operating state is supplied to the information platform (e.g., from the connected functions), which then in turn transmits corresponding data to the affected sensor(s).

Figure 5:
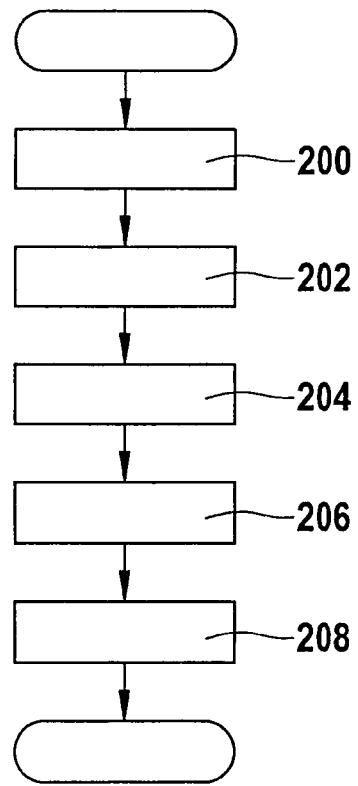
FIG. 5 shows a flow chart illustrating an example of a concrete embodiment of a program for sensor control running in the processing unit.

A flow chart is outlined in FIG. 5, which illustrates the mode of operation of the information platform using the example of production and transmission of detection area data. The outlined program is executed in predefined time intervals. In a first step 200, object data are received from a first sensor, for example, from a radar sensor. These object data include data relating to detected objects such as the location of the object (for example, angular relationships or coordinates), the relative velocity or absolute velocity of the object, the distance from the object, its movement direction, etc. In the preferred exemplary embodiment, the corresponding data are transmitted as a list for various detected objects. Subsequently, in step 202, detection areas (ROI) are produced on the basis of the detected object data. For example, the location of the detected object is evaluated using variance values and a detection area is spanned in this way. If the reference systems of the individual sensors and/or the information platform are different, the data must be transformed into the appropriate reference systems, of course.

Another possibility is to use not only the center point of the detected object as the basis for the calculation of the detection area, but rather also the velocity of the object, a larger detection area being laid out at a higher velocity of the object, which is additionally adapted in its embodiment in accordance with the movement direction of the object in such a way that it is larger in the movement direction than to the side or downward.

Identification numbers are then assigned to the individual detection areas in step 204. Furthermore, in one embodiment, each detection area is provided with priority values in step 206. In the preferred exemplary embodiment, the detection area which represents an object which is closest to the vehicle is to be handled with the highest priority. In following step 208, the data on the detection areas are transmitted to another sensor, such as the video sensor, which executes the task of object detection in the special detection areas. If necessary, the video sensor system feeds back, possibly together with a time stamp, to the information platform, as well as the result, for example, as to whether or not an object detected by the radar sensor passed the plausibility check. In the first case, the information is relayed to the downstream functionalities, otherwise it is discarded.

What is claimed is:

1. A method for operating a sensor system having a plurality of sensors, comprising:
   causing a processing unit to receive first data from a first one of the sensors, the first data characterizing an object detected by the first sensor;
   responsive to receiving the first data, transmitting second data to a second one of the sensors via at least one communication connection,
   wherein the second data identifies at least one detection area located inside a sensing range of the second sensor, and the second sensor monitors the at least one detection area.

2. The method as recited in claim 1, wherein the second data identifies an orientation of the sensing range of the sensor.

3. The method as recited in claim 1, wherein the detection areas are characterized at least by their center point.

4. The method as recited in claim 1, wherein for each identified detection area at least one of an identification number and prioritization data is transmitted together with the second data, the at least one of an identification number and prioritization data being assigned to its respective detection area.

5. The method as recited in claim 1, wherein the processing unit receives information relating to the operating state of the vehicle and transmits control data to at least one sensor, the control data adapting the sensor to the operating situation of the vehicle.

6. The method as recited in claim 5, wherein the information obtained represents the expected lane marking and/or the road type.

7. The method as recited in claim 6, wherein the control data include a change of the cycle time of the sensor, an adaptation of the recognition thresholds, an adaptation of the model for roadway edge recognition, or a shutoff of partial functions.

8. A device for operating a sensor system, comprising:
   a processing unit connected to a first sensor and a second sensor via respective communication connections, wherein:
   the processing unit receives first data from the first sensor, the first data characterizing an object detected by the first sensor;
   responsive to receiving the first data, the processing unit transmits second data to the second sensor; and
   the second data identifies at least one detection area located inside a sensing range of the second sensor, and the second sensor monitors the at least one detection area.

* * * * *